US012744695B2

(12) United States Patent
Lakshmikumar et al.

(10) Patent No.: US 12,744,695 B2
(45) Date of Patent: Sep. 22, 2026

(54) EQUALIZER WITH ALL-PASS FILTER DELAY

(71) Applicant: Cisco Technology, Inc., San Jose, CA (US)

(72) Inventors: Kadaba Lakshmikumar, Hillsborough, NJ (US); Abhishek Bhat, Allentown, PA (US); Romesh Kumar Nandwana, Carlsbad, CA (US)

(73) Assignee: Cisco Technology, Inc., San Jose, CA (US)

( * ) Notice: Subject to any disclaimer, the term of this patent is extended or adjusted under 35 U.S.C. 154(b) by 36 days.

(21) Appl. No.: 19/009,647

(22) Filed: Jan. 3, 2025

(65) Prior Publication Data

US 2026/0197212 A1 Jul. 9, 2026

(51) Int. Cl.

| | |
|---|---|
| ***H04L 27/01*** | (2006.01) |
| ***H04B 3/14*** | (2006.01) |
| ***H04L 25/03*** | (2006.01) |

(52) U.S. Cl.

CPC ............. *H04L 27/01* (2013.01); *H04B 3/145* (2013.01); *H04L 25/03885* (2013.01)

(58) Field of Classification Search

CPC ...... H04L 27/01; H04L 25/0388; H04B 3/145

USPC .......................................................... 375/262

See application file for complete search history.

(56) References Cited

U.S. PATENT DOCUMENTS

| | | | |
|---|---|---|---|
| 9,654,310 B1 | 5/2017 | Chang | |
| 10,505,509 B2 | 12/2019 | Lakshmikumar et al. | |
| 2005/0099225 A1 | 5/2005 | Kamoshida | |
| 2009/0072896 A1 * | 3/2009 | Han ...................... | H04B 3/144 333/28 R |
| 2019/0342128 A1 | 11/2019 | Francese et al. | |
| 2023/0022072 A1 | 1/2023 | Mariglio, III et al. | |

OTHER PUBLICATIONS

Chen D., et al., “SerDes Transceivers for High-speed Serial Communications”, uploaded on Mar. 3, 2017, pp. 1-31.

Lakshmikumar K., et al., “A Process and Temperature Insensitive CMOS Linear TIA for 100 Gbps/Lambda PAM-4 Optical Links”, IEEE Custom Integrated Circuits Conference (CICC), Apr. 8-11, 2018, 4 Pages.

Mammei E., et al., “Analysis and Design of a Power-Scalable Continuous-Time FIR Equalizer for 10 GB/s to 25 GB/s Multi-Mode Fiber EDC in 28 nm LP CMOS”, IEEE Journal of Solid-state Circuits, vol. 49, No. 12, Dec. 2014, pp. 3130-3140.

* cited by examiner

*Primary Examiner* — Fitwi Y Hailegiorgis

(74) *Attorney, Agent, or Firm* — Patterson + Sheridan, LLP

(57) ABSTRACT

The present disclosure describes an equalizer that uses an all-pass filter to delay a signal to a transconductor cell. According to an embodiment, the equalizer includes an input line, a first transconductor cell connected to the input line, a filter, and a second transconductor cell. The filter includes a first inverter connected to the input line, a second inverter connected to an output of the first inverter, and a third inverter connected to the input line and the output of the second inverter. The second transconductor cell is connected to the output of the second inverter.

20 Claims, 8 Drawing Sheets

202
In
Out
302
304
306
308
310
312

EQUALIZER WITH ALL-PASS FILTER DELAY

TECHNICAL FIELD

Embodiments presented in this disclosure generally relate to optical modules. More specifically, embodiments disclosed herein relate to equalizers for optical transceivers.

BACKGROUND

As the capacity delivered by switching chips continue to grow, the power consumption of optical transceivers has begun to exceed that of switching chips, becoming a key factor in network solutions. For example, in some existing switches, optical transceivers may represent 16% or more of the power consumed by the switches under standard operating conditions. The digital signal processor (DSP) in the transceivers, which may be used to overcome optical and electrical impairments in both long and short hauls, may account for around 50% to 70% of the power consumption of the transceiver.

To reduce power consumption and cost while providing high-speed, high-density optical communication connections, linear-drive pluggable optics (LPO) modules have emerged. LPO technology uses a linear drive approach, replacing DSPs with transimpedance amplifiers (TIAs) and drivers (e.g., drive chips) with high linearity. This design significantly reduces power consumption and latency relative to using DSPs.

Optical transceivers may include equalizers that adjust electrical signals to counteract the effects of a channel (e.g., the frequency response of the channel). It may be difficult, however, to implement an equalizer for an LPO module because an LPO module does not use a clock signal, which may inhibit the use of timing elements.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
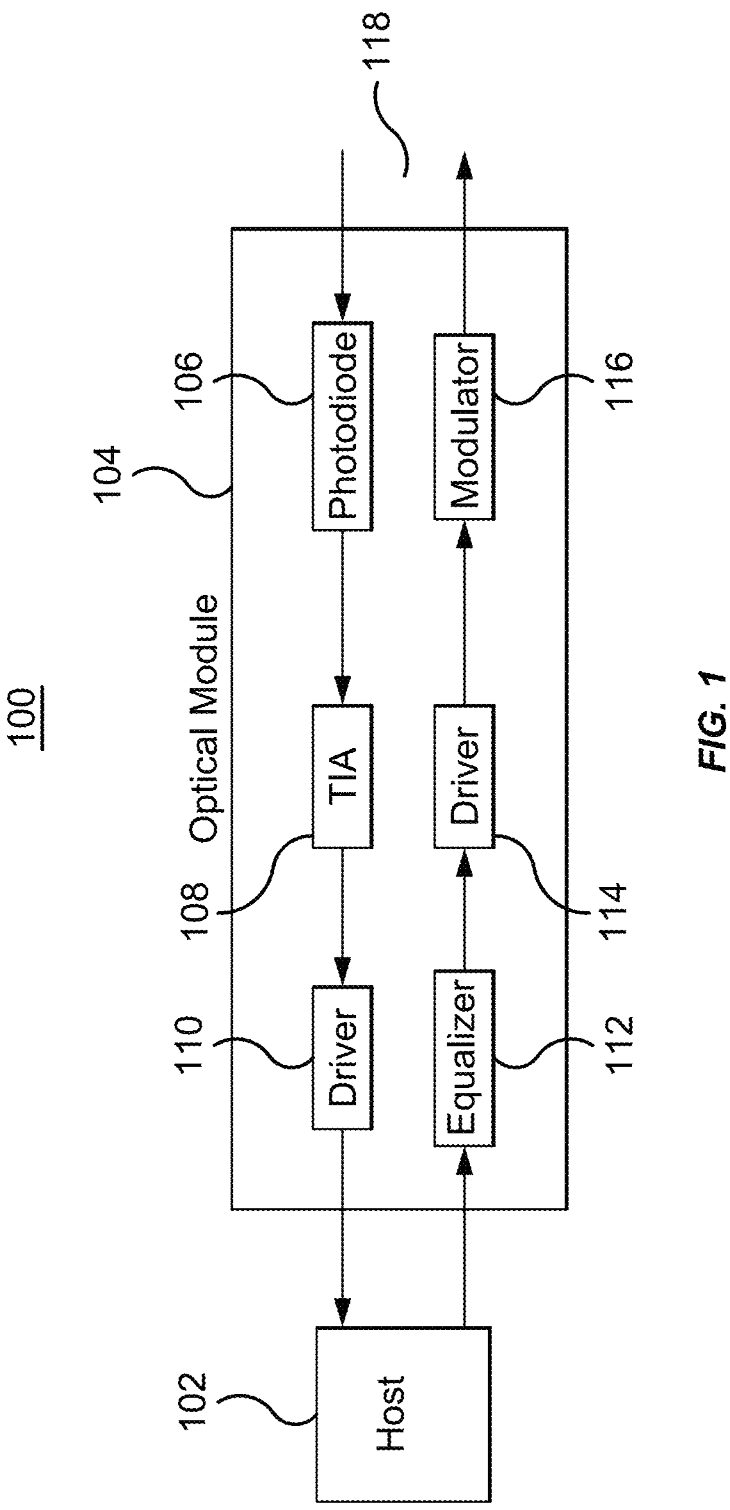
FIG. 1 illustrates an example system.

The present disclosure describes an equalizer that uses an all-pass filter to delay a signal to a transconductor cell. According to an embodiment, the equalizer includes an input line, a first transconductor cell connected to the input line, a filter, and a second transconductor cell. The filter includes a first inverter connected to the input line, a second inverter connected to an output of the first inverter, and a third inverter connected to the input line and the output of the second inverter. The second transconductor cell is connected to the output of the second inverter.

According to another embodiment, a method includes providing a transconductance using a first transconductor cell connected to an input line and delaying, using a filter, a signal. The filter includes (i) a first inverter connected to the input line, (ii) a second inverter connected to an output of the first inverter, and (iii) a third inverter connected to the input line and the output of the second inverter. The method also includes providing a transconductance using a second transconductor cell connected to the output of the second inverter.

According to another embodiment, an equalizer includes an input line, a first transconductor cell of a main cursor of the equalizer, an all-pass filter, and a second transconductor cell of a post-cursor of the equalizer. The all-pass filter includes a first inverter connected to the input line, a second inverter connected to an output of the first inverter, and a third inverter connected to the input line and the output of the second inverter. The all-pass filter delays a signal from the input line. The second transconductor cell is connected to the output of the second inverter. The second transconductor cell receives the signal from the all-pass filter.

EXAMPLE EMBODIMENTS

The present disclosure describes an equalizer (e.g., in an LPO module) that uses a filter as a timing or delay element. Generally, the filter may be an all-pass filter (e.g., passes all frequencies without necessarily introducing gain) that introduces delay into a signal passing through the filter. The filter may include multiple inverters with different transconductances. The filter may be positioned between two cursors of the equalizer, such as between the main cursor and a post-cursor or between a pre-cursor and a main cursor. The filter may introduce delay into signals traveling to the post-cursor or main cursor.

In certain embodiments, the equalizer presents several technical advantages. For example, the equalizer may have a smaller size or area relative to existing equalizers that use inductor-capacitor circuits to introduce delay. As another example, the equalizer may use less power than existing equalizers that use the inductor-capacitor circuits. As another example, the equalizer may provide frequency dependent group delay. As a result, the equalizer may operate as a Baud-rate spaced equalizer at low frequency and as a fractionally spaced equalizer beyond the Nyquist frequency, which, unlike existing Baud-rate spaced equalizers using inductor-capacitor delay lines, may provide equalization beyond the Nyquist frequency.

FIG. 1 illustrates an example system 100, which may be an optical system. As seen in FIG. 1, the system 100 includes a host 102, and an optical module 104. The host 102 may be in electrical communication with the optical module 104. Generally, the optical module 104 converts electrical signals from the host 102 into optical signals. Additionally, the optical module 104 converts optical signals into electrical signals for the host 102.

The host 102 may be an electronic device that connects with the optical module 104. For example, the host 102 may be a computer, a server, an access point, a router, or any other electronic device that transmits and receives electrical signals to communicate with other devices. The host 102 may provide an interface (e.g., a port) to which the optical module 104 connects. After the host 102 is connected with the optical module 104, the host 102 may communicate electrical signals to and from the optical module 104. For example, the host 102 may transmit electrical signals that include data for another device. The optical module 104 may convert those electrical signals into optical signals that include the data. The optical module 104 then transmits the optical signals towards their destination. As another example, the optical module 104 may receive an optical signal that includes data. The optical module 104 may convert the optical signal into an electrical signal that includes the data. The optical module 104 then directs the electrical signal to the host 102, and the host 102 may process the data in the electrical signals.

The optical module 104 may be an optical transceiver that converts electrical signals into optical signals and optical signals into electrical signals. For example, the optical module 104 may convert electrical signals from the host 102 to optical signals, and the optical module 104 may convert optical signals into electrical signals for the host 102. As seen in FIG. 1, the optical module 104 includes a photodiode 106, a transimpedance amplifier 108, a driver 110, an equalizer 112, a driver 114, and a modulator 116.

The photodiode 106 receives an optical signal carrying data and converts that optical signal into an electrical signal. For example, the photodiode 106 may convert a received optical signal into an electric current. The magnitude of the electric current may depend on the intensity or content of the optical signal. The transimpedance amplifier 108 converts the electric current into a voltage. The driver 110 then conditions the voltage for the host 102. The host 102 may extract data from the voltage signal from the driver 110 and process that data.

The host 102 also transmits electrical signals that carry data. For example, the host 102 may transmit electric voltages and/or current that carry data from the host 102. The equalizer 112 adjusts the electrical signal from the host 102 to mitigate impairments introduced by the optical channel 118 between the optical module 104 and another receiving device (e.g., another optical module). By mitigating the impairments, or losses introduced by the channel 118, the receiving device may correctly extract the data from the signal. In certain embodiments, the equalizer 112 adjusts the electrical signals using transconductor cells implemented using switchable inverters. As a result, the equalizer 112 may perform equalization without relying on a clock signal.

The driver 114 adjusts the voltage and/or current from the equalizer 112. As a result, the driver 114 conditions the electrical signal from the equalizer 112 for the modulator 116. The modulator 116 modulates an optical signal (e.g., from an optical source such as a laser) with the data in the electrical signal from the driver 114. In this manner, the modulator 116 generates an optical signal that carries the data from the host 102. The modulator 116 transmits the generated optical signal through the optical channel 118 to the receiving device. In this manner, the optical module 104 transmits data from the host 102 as an optical signal.

In some embodiments, the equalizer 112 uses a filter (e.g., an all-pass filter) to introduce delay into signals from the host. These delays may allow the transconductor cells in the equalizer 112 to implement various cursors (e.g., pre-cursor, main cursor, post-cursor) of the equalizer 112 without relying on a clock signal. The filter may have a smaller footprint than inductor-capacitor circuits that some existing equalizers use to introduce delay. Additionally, the filter may consume less power than the inductor-capacitor circuits.

Figure 2:
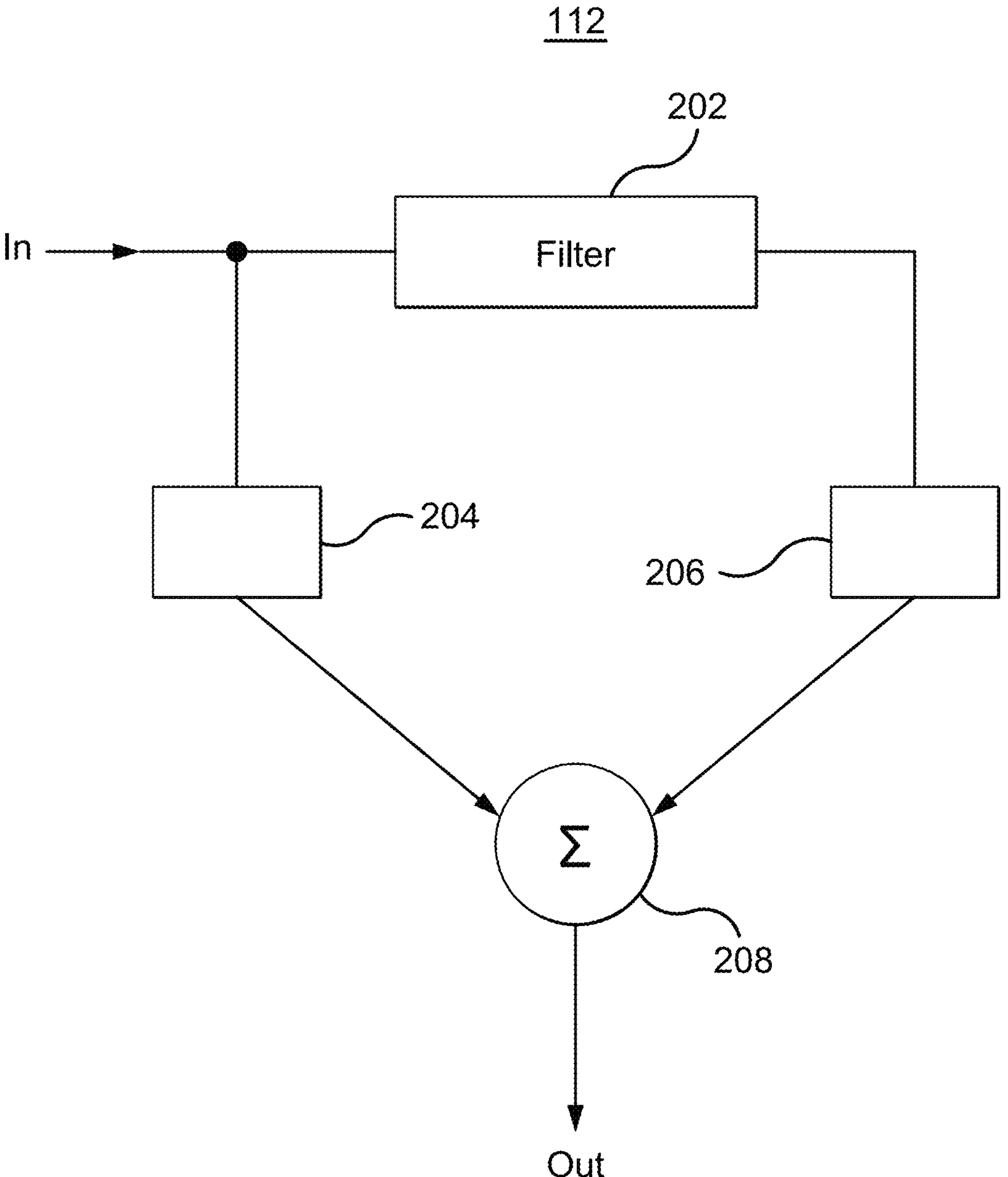
FIG. 2 illustrates an example equalizer in the system of FIG. 1.

FIG. 2 illustrates an example equalizer 112 in the system 100 of FIG. 1. As seen in FIG. 2, the equalizer 112 includes an input line (In), a filter 202, a transconductor cell 204, a transconductor cell 206, a combiner 208, and an output line (Out). Generally, the transconductor cells 204 and 206 implement cursors of the equalizer 112, and the filter 202 introduces delay into a signal to the transconductor cell 206.

The filter 202 is coupled to the input line and receives a signal from the input line. The filter 202 may be an all-pass filter that passes all frequencies without introducing gain, and the filter 202 may introduce delay into the signal. As a result, the filter 202 delays the signal from the input line without necessarily changing the frequency or amplitude of the signal. The filter 202 directs the signal to the transconductor cell 206.

The transconductor cell 204 receives the signal from the input line, and the transconductor cell 206 receives the delayed signal from the filter 202. The transconductor cells 204 and 206 implement cursors of the equalizer 112. For example, the transconductor cell 204 may implement a main cursor of the equalizer 112, and the transconductor cell 206 may implement a post-cursor of the equalizer 112. The transconductor cells 204 and 206 may apply different tap weights to the signal and/or the delayed signal. Adjusting the transconductance of the transconductor cells 204 and 206 may adjust the tap weights applied by the transconductor cells 204 and 206.

The combiner 208 combines or sums the outputs of the transconductor cells 204 and 206. The combiner 208 then outputs the combined or summed signal over the output line. In some embodiments, the combiner 208 includes one or more resistors that convert the output voltages of the transconductor cells 204 and 206 into output currents. The output currents may then be combined or summed by directing the output currents to a common node (e.g., the output line).

The example of FIG. 2 includes a limited number of transconductor cells and filters for clarity. The equalizer 112 may include any number of transconductor cells that implement any number of cursors. Additionally, the equalizer 112 may include any number of filters to introduce any amount of delay into the signals to the transconductor cells. The combiner 208 may then combine the outputs of the transconductor cells to produce an output of the equalizer 112.

Figure 3:
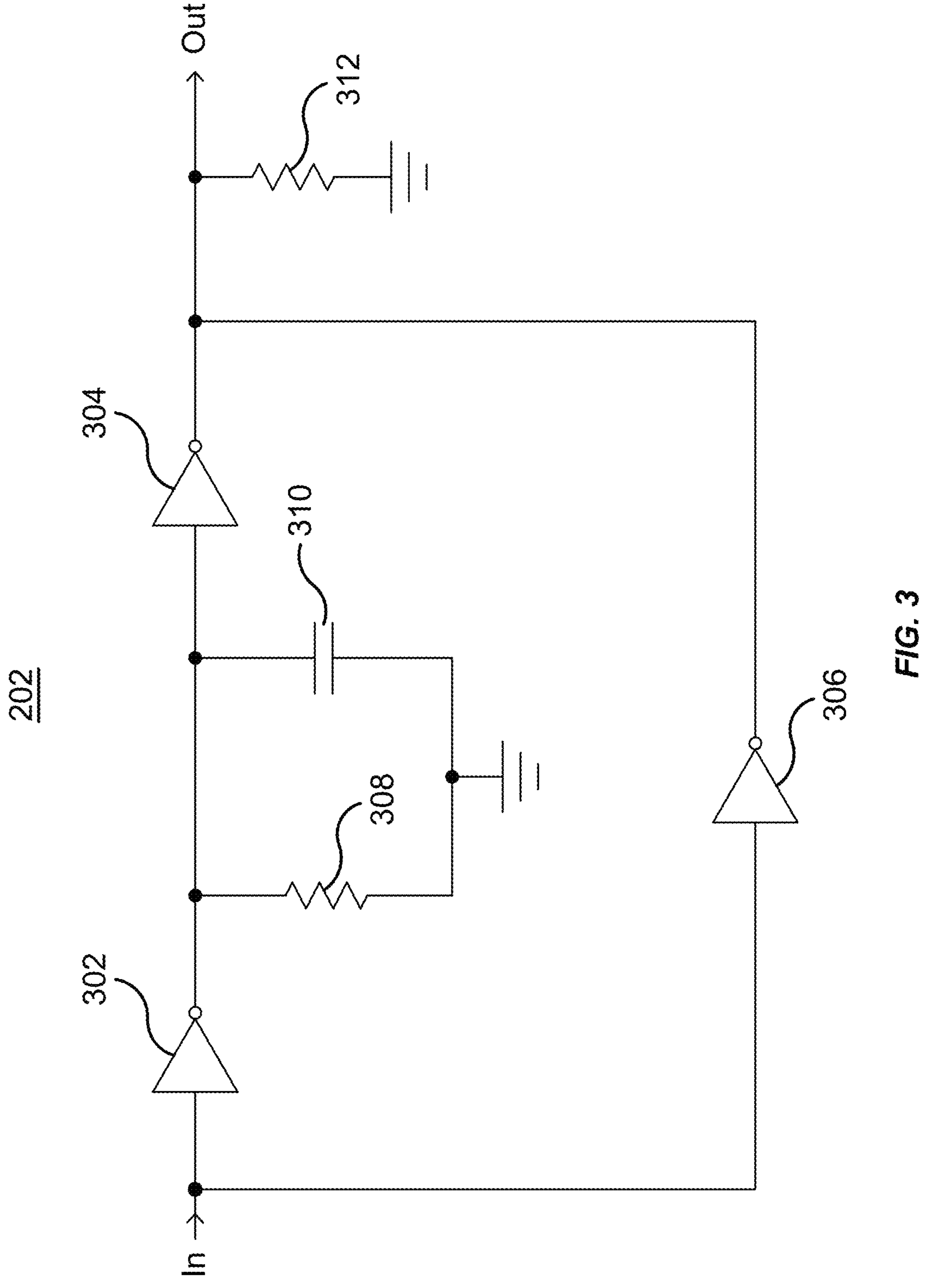
FIG. 3 illustrates an example filter in the equalizer of FIG. 2.

FIG. 3 illustrates an example filter 202 in the equalizer 112 of FIG. 2. As seen in FIG. 3, the filter 202 includes an inverter 302, an inverter 304, an inverter 306, a resistor 308, a capacitor 310, and a resistor 312. Generally, these components may implement an all-pass filter that introduces delay into an input signal.

As seen in FIG. 3, the inverter 302 and the inverter 306 are connected to an input line of the filter 202. As seen in FIG. 2, the input line of the filter 202 may be connected to the input line of the equalizer 112. As a result, the inverter 302 and the inverter 306 may receive an input signal of the equalizer 112. The inverter 304 is connected to an output of the inverter 302. The resistor 308 and the capacitor 310 are connected to the output of the inverter 302, and the resistor 308 and the capacitor 310 are connected to electrical ground. The resistor 312 is connected to the output of the inverter 304 and the output of the inverter 306, and the resistor 312 is connected to electrical ground. The output of the inverter 304 and the output of the inverter 306 are connected to an output line of the filter 202.

In some embodiments, the inverters 302, 304, and 306, the resistor 308, the capacitor 310, and the resistor 312 implement an all-pass filter that passes a signal handled by an equalizer (e.g., the equalizer 112 shown in FIG. 2) without necessarily changing the frequency or amplitude of the signal. The all-pass filter may introduce delay into the signal, and the amount of delay may depend on the frequency of the signal. For example, as the frequency of signal increases, the amount of delay introduced into the signal may decrease. In some instances, the filter 202 allows the equalizer to perform equalization beyond the Nyquist frequency.

The transconductance of the inverters 302, 304, and 306 may be set with particular, relative values and the resistors 308 and 312 and the capacitor 310 may be selected with particular values to cause the filter 202 to behave as an all-pass filter. In some embodiments, the inverters 302 and 306 may have the same transconductance while the inverter 304 has a transconductance that is double the transconductance of the inverters 302 and 306 (e.g., the inverters 302 and 306 have a transconductance that is half the transconductance of the inverter 304). Additionally, the resistors 308 and 312 may have the same resistance. In certain embodiments, the inverter 306 may have a transconductance while the inverters 302 and 304 have a transconductance that is double the transconductance of the inverter 306 (e.g., the inverter 306 has a transconductance that is half the transconductance of the inverters 302 and 304). Additionally, the resistor 312 may have a resistance that is double the resistance of the resistor 308. In certain embodiments, the gain of the top transconductance path (e.g., the path that includes the inverters 302 and 304, the resistor 308, and the capacitor 310) may be double the gain of the bottom transconductance path (e.g., the path that includes the inverter 306).

In some embodiments, the resistor 308 and/or the resistor 312 may be replaced with a shorted inverter (e.g., an inverter with an output connected to an input). The shorted inverter may provide an improved linear response relative to the resistor.

Figure 4:
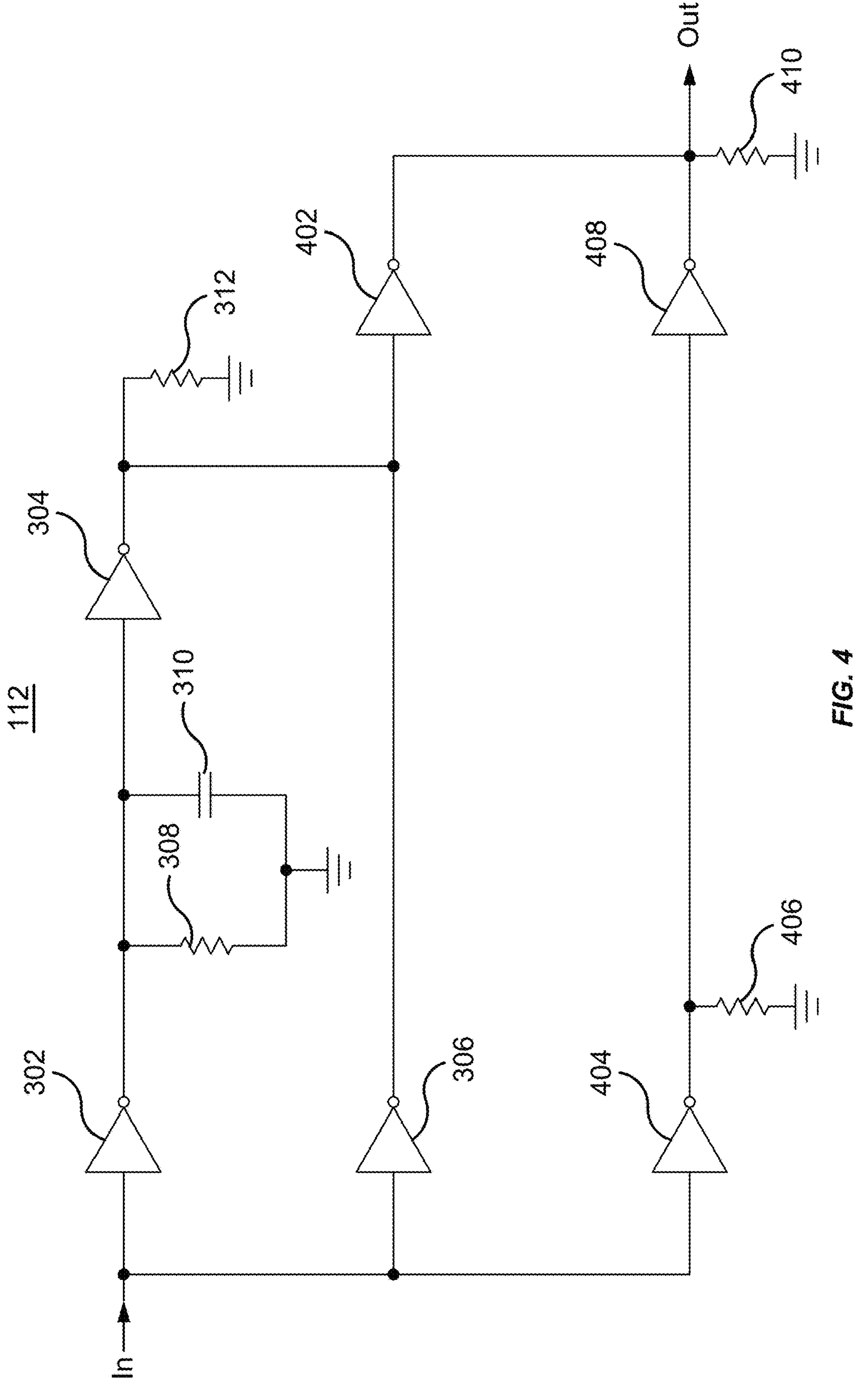
FIG. 4 illustrates an example equalizer in the system of FIG. 1.

FIG. 4 illustrates an example equalizer 112 in the system 100 of FIG. 1. As seen in FIG. 4, the equalizer 112 includes the inverter 302, the inverter 304, the inverter 306, the resistor 308, the capacitor 310, the resistor 312, an inverter 402, an inverter 404, a resistor 406, an inverter 408, and a resistor 410. The inverters 302, 306, and 404 are connected to an input line of the equalizer 112. The inverter 304, resistor 308, and capacitor 310 are connected to an output of the inverter 302. The resistor 308 and the capacitor 310 are also connected to electrical ground. The resistor 312 and the inverter 402 are connected to an output of the inverter 304 and an output of the inverter 306. The resistor 312 is also connected to electrical ground. The resistor 406 and the inverter 408 are connected to an output of the inverter 404. The resistor 406 is also connected to electrical ground. The resistor 410 is connected to an output of the inverter 402 and an output of the inverter 408. The resistor 410 is also connected to electrical ground. An output line of the equalizer 112 is connected to the output of the inverter 402, the output of the inverter 408, and the resistor 410.

Generally, the inverters 302, 304, 306, and 404, the resistors 308 and 312, and the capacitor 310 may form a filter (e.g., an all-pass filter) that introduces delay into a signal on the input line of the equalizer 112. The inverter 402 may form a transconductor cell that serves as a post-cursor for the equalizer 112. The inverter 408 and the resistor 406 may form a transconductor cell that serves as a main cursor for the equalizer 112. The resistor 410 may convert a voltage on the outputs of the inverters 402 and 408 into a current, and the output line may output a portion of the current. In this manner, the resistor 410 form part of a combiner (e.g., the combiner 208 shown in FIG. 2) that combines or sums currents from transconductor cells.

The transconductances of the inverters 302, 304, 306, 402, 404, and/or 408 may be set such that the filter performs as an all-pass filter and the transconductor cells apply certain tap weights. For example, the inverter 402 may have a transconductance (e.g., 8X). The inverters 302, 306, and 404 may have a transconductance (e.g., 32X) that is four times the transconductance of the inverter 402. The inverter 304 may have a transconductance (e.g., 64X) that is eight times the transconductance of the inverter 402. The inverter 408 may have a transconductance (e.g., 24X) that is three times the transconductance of the inverter 402. Additionally, the resistors 308, 312, 406, and 410 may have the same resistance. As a result, the filter behaves as an all-pass filter that delays a signal to the transconductor cell formed using the inverter 402, the transconductor cell formed using the inverter 402 applies a tap weight of 0.25, and the transconductor cell formed using the inverter 408 applies a tap weight of 0.75.

Figure 5:
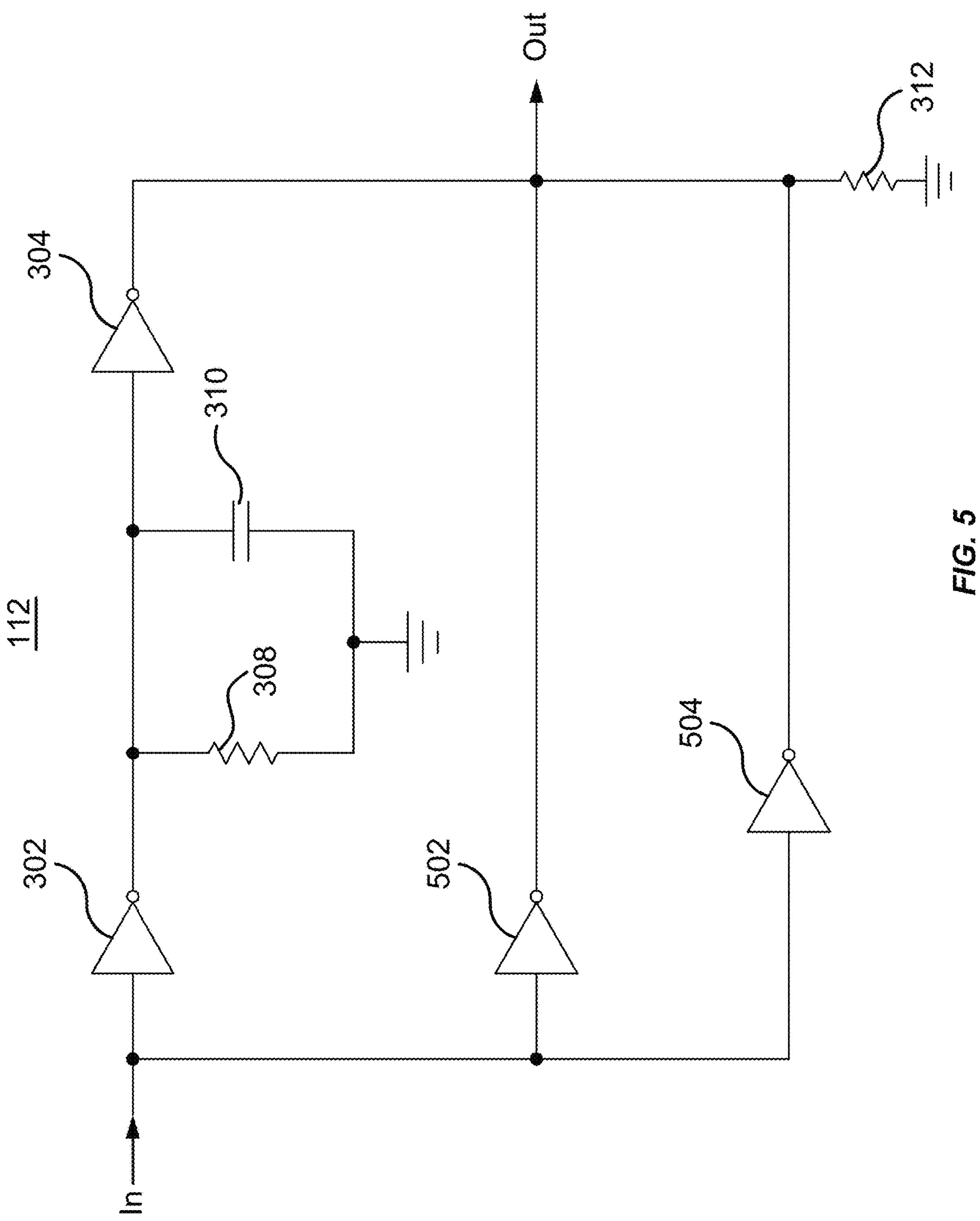
FIG. 5 illustrates an example equalizer in the system of FIG. 1.

FIG. 5 illustrates an example equalizer 112 in the system 100 of FIG. 1. As seen in FIG. 5, the equalizer 112 includes the inverter 302, the inverter 304, the resistor 308, the capacitor 310, the resistor 312, an inverter 502, and an inverter 504. Generally, the equalizer 112 shown in FIG. 5 merges certain inverters in the example equalizer shown in FIG. 4. For example, the inverter 502 may merge the inverters 306 and 402 shown in FIG. 4, and the inverter 504 may merge the inverters 404 and 408 shown in FIG. 4. As a result, the example of FIG. 5 reduces the number of inverters used, which may reduce power consumption. In some embodiments, the inverters 502 and 504 are also merged into one inverter.

In certain embodiments, the inverter 502 has a transconductance (e.g., 8X). The inverter 302 has a transconductance (e.g., 16X) that is double the transconductance of the inverter 502 (e.g., the inverter 502 has a transconductance that is half the transconductance of the inverter 502). The inverter 504 has a transconductance (e.g., 24X) that is triple the transconductance of the inverter 502. The inverter 304 has a transconductance (e.g., 32X) that is four times the transconductance of the inverter 502. Additionally, the resistor 308 has a resistance, and the resistor 312 has a resistance that is 20% larger than the resistance of the resistor 308. In this manner, the inverters 302, 304, and 502, the resistor 308, and the capacitor 310 implement a post-cursor of the equalizer 112 that applies a tap weight of 0.25, and the inverter 504 implements a main cursor that applies a tap weight of 0.75. The inverters 302, 304, and 502, the resistor 308, and the capacitor 310 effectively form a filter (e.g., an all-pass filter) that introduces delay and a transconductor cell that applies a tap weight. The resistor 312 forms a combiner that converts the outputs of the inverters 304, 502, and 504 into currents, and those currents are combined or summed at the output line of the equalizer 112. For example, the resistor 312 may combine the output currents of the inverters 304, 502, and 504 to generate an output voltage of the equalizer 112. In some embodiments, the resistor 308, the capacitor 310, and/or the resistor 312 may be sized to adjust a delay of a filter in the equalizer 112 (e.g., based on baud rate and/or the peaking frequency requirements).

Figure 6:
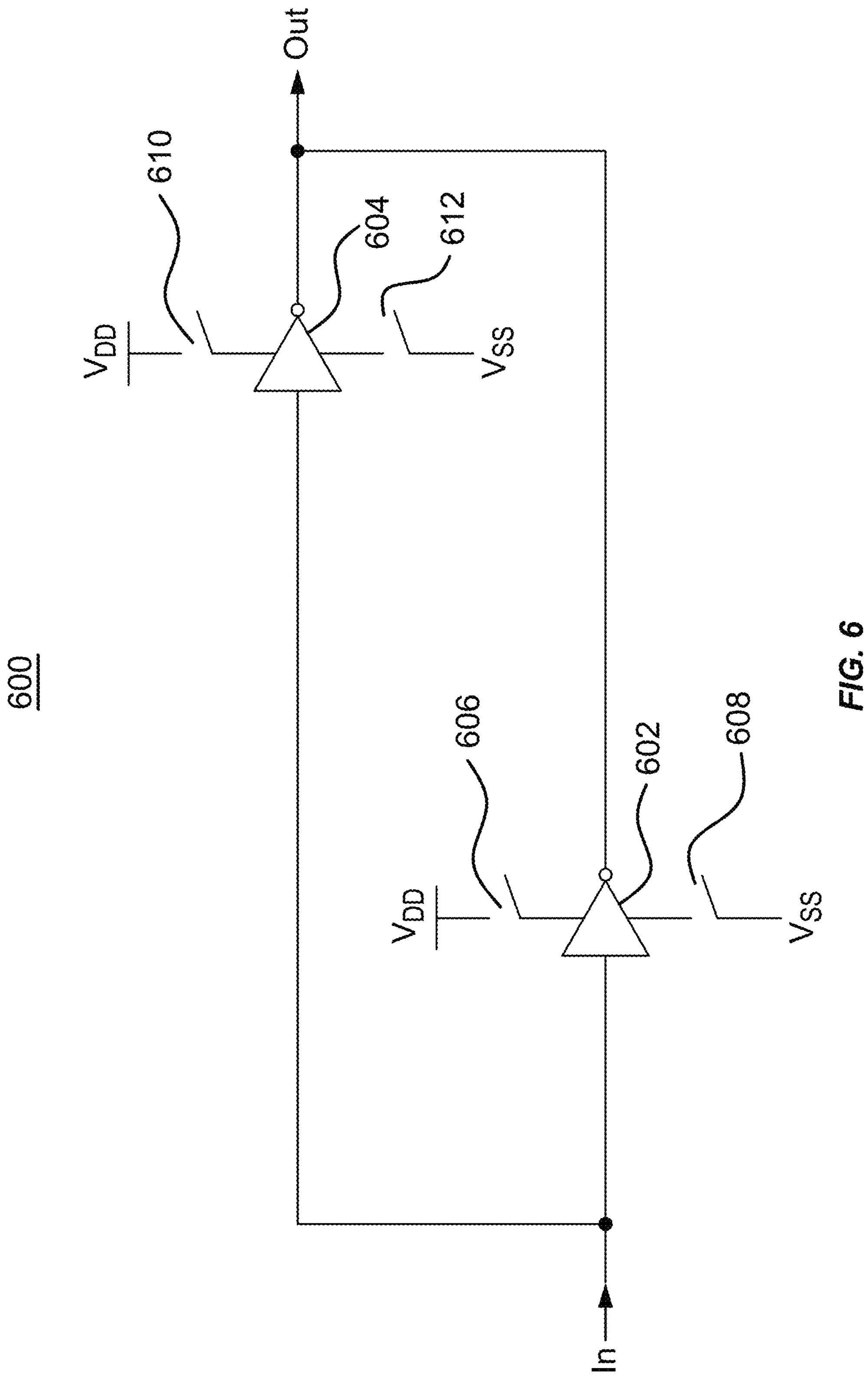
FIG. 6 illustrates an example inverter in the system of FIG. 1.

FIG. 6 illustrates an example inverter 600 in the system 100 of FIG. 1. As seen in FIG. 6, the inverter 600 includes an inverter 602 and an inverter 604 arranged in parallel with each other. For example, the inverter 600 may be used as the inverters 302, 304, and 306 shown in FIG. 3, as the inverters 302, 304, 306, 402, 404, and 408 shown in FIG. 4, and/or the inverters 302, 304, 502, and 504 shown in FIG. 5. Generally, the inverters 602 and 604 are switchable inverters that can be powered on or off to adjust the transconductance of the inverter 600, which may adjust a tap weight applied by a transconductor cell formed using the inverter 600. For clarity, the inverter 600 is shown with two switchable inverters, but is to be understood that the inverter 600 may include any number of switchable inverters. These switchable inverters may be powered on or off such that the inverter 600 implements any tap weight.

In the example of FIG. 6, the inverter 602 is connected to a switch 606 and a switch 608. Operating the switches 606 and 608 controls electrical power to the inverter 602. The inverter 604 is connected to a switch 610 and a switch 612. Operating the switches 610 and 612 controls electrical power to the inverter 604. As an example, by turning the switches 606 and 608 and/or the switches 610 and 612 ON and OFF, the total current output of the inverter 602 and/or 604 may be controlled, which controls the transconductance of the inverter 602 and/or 604. As a result, the transconductance may be direction proportional to power consumption, which represents an improvement to power efficiency (e.g., low transconductance consumes lower power or current, and vice versa). These switches 606, 608, 610, and 612 may be operated using control signals (e.g., from the host 102 shown in FIG. 1 or from a controller to the optical module 104 shown in FIG. 1).

In some embodiments, the inverter 602 and/or the inverter 604 may be complementary metal-oxide semiconductor (CMOS) inverters. The inverter 602 and/or the inverter 604 may include a p-channel metal-oxide semiconductor (PMOS) transistor and an n-channel metal-oxide semiconductor (NMOS) transistor.

Figure 7:
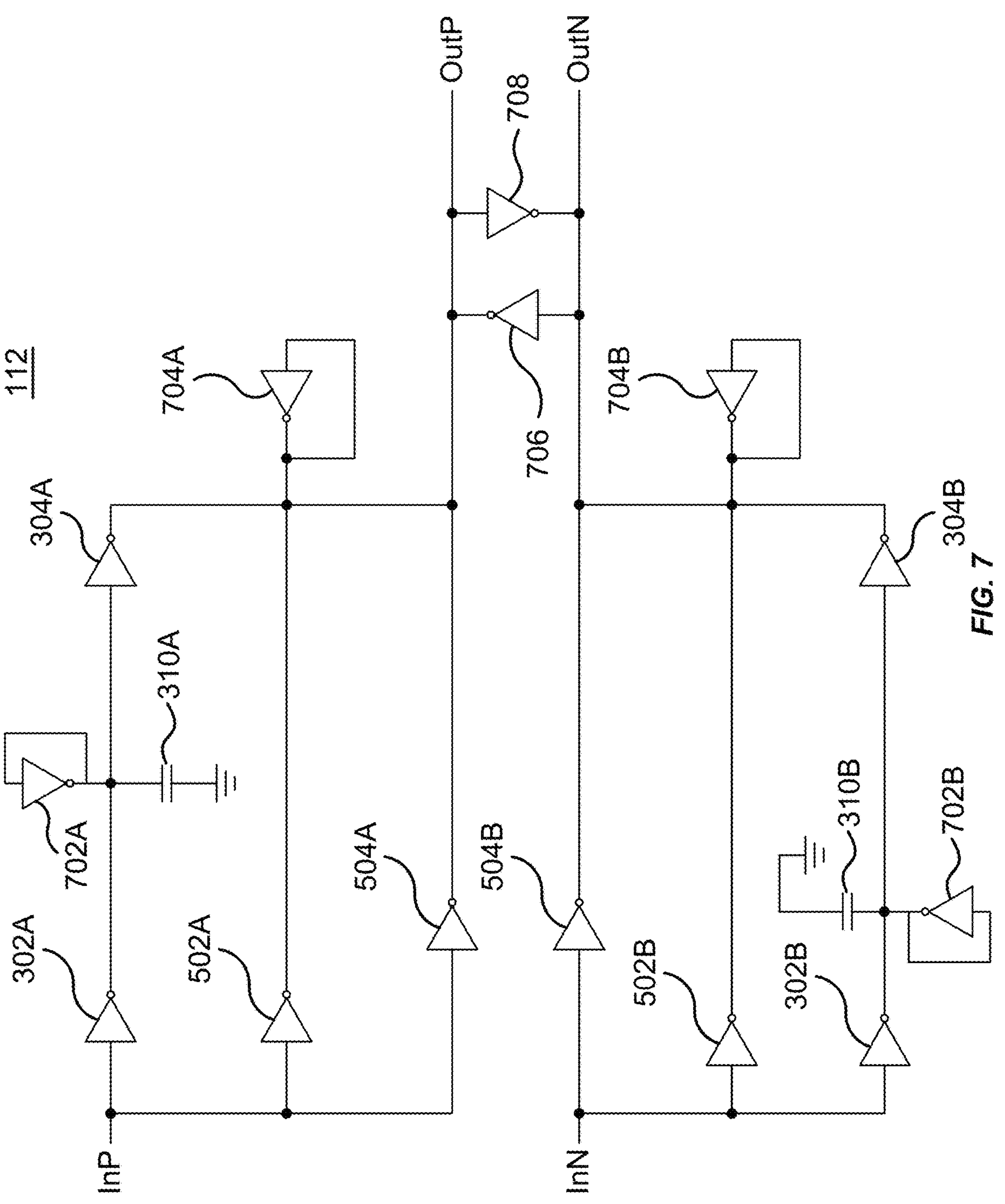
FIG. 7 illustrates an example equalizer in the system of FIG. 1.

FIG. 7 illustrates an example equalizer 112 in the system 100 of FIG. 1. Generally, the equalizer 112 shown in FIG. 7 provides a differential implementation of the equalizer shown in FIG. 5. As seen in FIG. 7, the equalizer 112 includes inverters 302A, 302B, 304A, 304B, 502A, 504B, 702A, 702B, 704A, 704B, 706, and 708, and capacitors 310A and 310B.

The inverters 302A, 502A, and 504A are connected to a positive input line (InP) of the equalizer 112. The inverter 304A is connected to an output of the inverter 302A. The capacitor 310A is connected to the output of the inverter 302A, and the capacitor 310A is connected to electrical ground. The inverters 702A and 704A are shorted inverters with inputs tied to the outputs of the inverters 702A and 704A. The inverter 702A is connected to the output of the inverter 302A, and the inverter 704A is connected to the outputs of the inverters 304A, 502A, and 504A.

The inverters 302B, 502B, and 504B are connected to a negative input line (InN) of the equalizer 112. The inverter 304B is connected to an output of the inverter 302B. The capacitor 310B is connected to the output of the inverter 302B, and the capacitor 310B is connected to electrical ground. The inverters 702B and 704B are shorted inverters with inputs tied to the outputs of the inverters 702B and 704B. The inverter 702B is connected to the output of the inverter 302B, and the inverter 704B is connected to the outputs of the inverters 304B, 502B, and 504B.

The outputs of the inverters 304A, 502A, and 504A are connected to a positive output line (OutP) of the equalizer 112. The outputs of the inverters 304B, 502B, and 504B are connected to a negative output line (OutN) of the equalizer 112. The inverters 706 and 708 are connected between the positive output line and the negative output line in opposite directions. In some embodiments, the inverters 706 and 708 provide improved amplitude and phase match.

As discussed previously, by shorting the inverters 702A, 702B, 704A, and 704B, these inverters 702A, 702B, 704A, and 704B effectively operate as resistors with improved linearity. These shorted inverters 702A, 702B, 704A, and 704B may be replaced with resistors. Additionally, any of the resistors shown in the examples of FIGS. 3, 4, and 5 may be replaced with shorted inverters.

Figure 8:
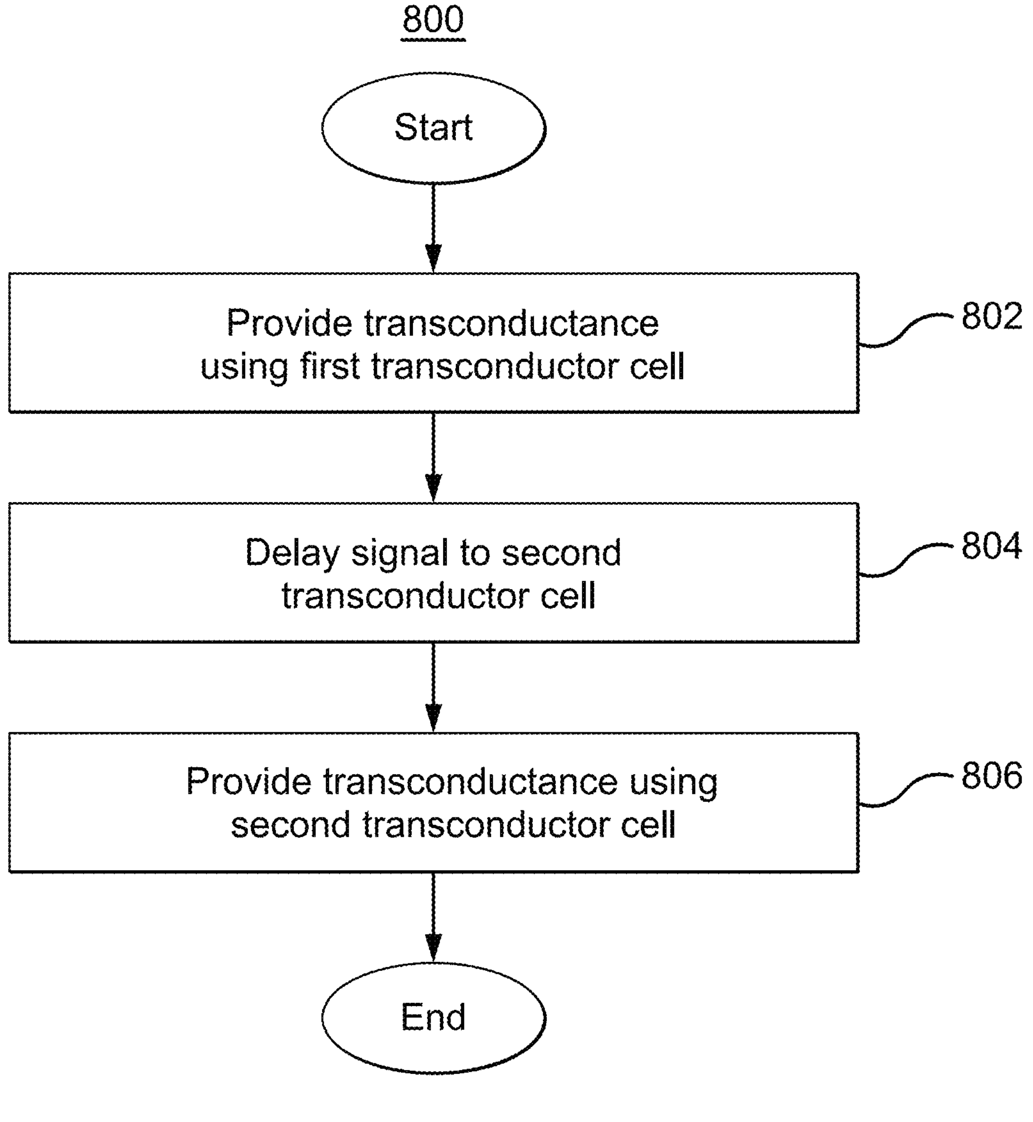
FIG. 8 is a flowchart of an example method performed by the system of FIG. 1.

FIG. 8 is a flowchart of an example method 800 performed by the system 100 of FIG. 1. In particular embodiments, an equalizer (e.g., the equalizer 112 shown in FIG. 1) performs the method 800. By performing the method 800, the equalizer uses a filter (e.g., an all-pass filter) to introduce delay into a signal to a transconductor cell.

At 802, the equalizer provides a transconductance using a first transconductor cell of the equalizer. The first transconductor cell may be formed using an inverter. Adjusting the transconductance of this inverter adjusts the transconductance of the first transconductor cell. Adjusting the transconductance of the first transconductor cell adjusts a tap weight applied by the first transconductor cell. For example, the first transconductor cell may apply a tap weight for a main cursor of the equalizer.

At 804, the equalizer delays a signal to a second transconductor cell of the equalizer. The equalizer may include a filter (e.g., an all-pass filter) that introduces delay into the signal. The filter may include inverters, resistors, and capacitors that operate together to introduce delay into the signal. The amount of delay introduced into the signal may depend on the frequency of the signal. For example, as the frequency of the signal increases, the amount of delay introduced into the signal may decrease. The filter may output the delayed signal to the second transconductor cell. In certain embodiments, using a filter to introduce delay into the signal reduces the size and power consumption of the equalizer relative to existing equalizers that use inductor-capacitor circuits to introduce delay.

At 806, the equalizer provides a transconductance using the second transconductor cell. The second transconductor cell may be formed using an inverter. Adjusting the transconductance of this inverter adjust the transconductance of the second transconductor cell. Adjusting the transconductance of the second transconductor cell adjusts a tap weight applied by the second transconductor cell. For example, the second transconductor cell may apply a tap weight for a post-cursor of the equalizer.

In summary, the equalizer 112 (e.g., in an LPO module) uses a filter as a timing or delay element. Generally, the filter may be an all-pass filter (e.g., passes all frequencies without introducing gain) that introduces delay into a signal passing through the filter. The filter may include multiple inverters with different transconductances. The filter may be positioned between two cursors of the equalizer 112, such as between the main cursor and a post-cursor. The filter may introduce delay into signals traveling to the post-cursor or main cursor.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

We claim:

1. An equalizer comprising:

an input line;

a first transconductor cell connected to the input line;

a filter comprising:

a first inverter connected to the input line;

a second inverter connected to an output of the first inverter; and a third inverter connected to the input line and the output of the second inverter; and a second transconductor cell connected to the output of the second inverter.

2. The equalizer of claim 1, wherein the filter further comprises:

a first resistor connected to the output of the first inverter;

a capacitor connected to the output of the first inverter; and a second resistor connected to the output of the second inverter.

3. The equalizer of claim 2, wherein the capacitor is programmable to adjust a delay of the filter.

4. The equalizer of claim 1, wherein:

the first inverter and the third inverter have a first transconductance; and the second inverter has a second transconductance that is double the first transconductance.

5. The equalizer of claim 1, wherein:

the first inverter has a first transconductance;

the second inverter has a second transconductance that is double the first transconductance; and the third inverter has a third transconductance that is half the first transconductance.

6. The equalizer of claim 1, wherein the second transconductor cell comprises the third inverter.

7. The equalizer of claim 1, wherein the first inverter comprises a fourth inverter and a fifth inverter and wherein a transconductance of the first inverter is adjusted by adjusting power to one or more of the fourth inverter or the fifth inverter.

8. The equalizer of claim 1, wherein the first transconductor cell comprises a fourth inverter.

9. The equalizer of claim 1, wherein the filter further comprises a shorted inverter connected to the output of the first inverter.

10. A method comprising:

providing a transconductance using a first transconductor cell connected to an input line;

delaying, using a filter, a signal, wherein the filter comprises (i) a first inverter connected to the input line, (ii) a second inverter connected to an output of the first inverter, and (iii) a third inverter connected to the input line and the output of the second inverter; and providing a transconductance using a second transconductor cell connected to the output of the second inverter.

11. The method of claim 10, wherein the filter further comprises:

a first resistor connected to the output of the first inverter;

a capacitor connected to the output of the first inverter; and a second resistor connected to the output of the second inverter.

12. The method of claim 10, wherein:

the first inverter and the third inverter have a first transconductance; and the second inverter has a second transconductance that is double the first transconductance.

13. The method of claim 10, wherein:

the first inverter has a first transconductance;

the second inverter has a second transconductance that is double the first transconductance; and the third inverter has a third transconductance that is half the first transconductance.

14. The method of claim 10, wherein the second transconductor cell comprises the third inverter.

15. The method of claim 10, wherein the first inverter comprises a fourth inverter and a fifth inverter and wherein a transconductance of the first inverter is adjusted by adjusting power to one or more of the fourth inverter or the fifth inverter.

16. The method of claim 10, wherein the first transconductor cell comprises a fourth inverter.

17. The method of claim 10, wherein the filter further comprises a shorted inverter connected to the output of the first inverter.

18. An equalizer comprising:

an input line;

a first transconductor cell of a main cursor of the equalizer;

an all-pass filter comprising:

a first inverter connected to the input line;

a second inverter connected to an output of the first inverter; and a third inverter connected to the input line and the output of the second inverter, wherein the all-pass filter is arranged to delay a signal from the input line; and a second transconductor cell of a post-cursor of the equalizer, wherein the second transconductor cell is connected to the output of the second inverter, and wherein the second transconductor cell is arranged to receive the signal from the all-pass filter.

19. The equalizer of claim 18, wherein the all-pass filter further comprises:

a first resistor connected to the output of the first inverter;

a capacitor connected to the output of the first inverter; and a second resistor connected to the output of the second inverter.

20. The equalizer of claim 18, wherein:

the first inverter and the third inverter have a first transconductance; and the second inverter has a second transconductance that is double the first transconductance.

* * * * *